Aug. 31, 1926.
A. PRATT
1,597,868
END THRUST BEARING
Filed Nov. 14, 1925
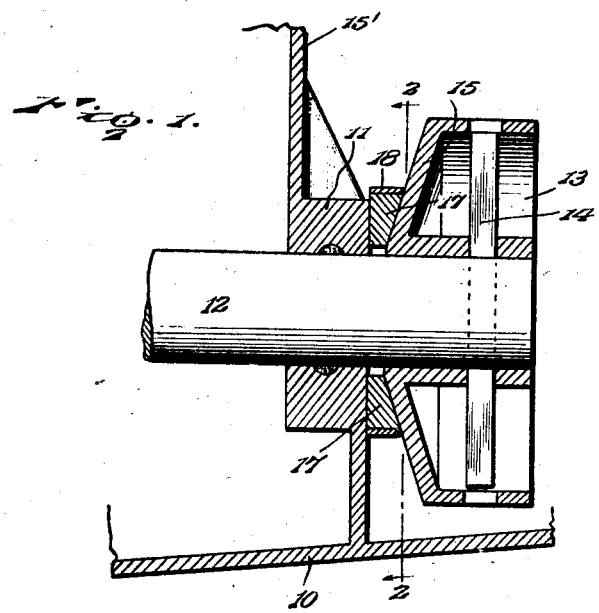
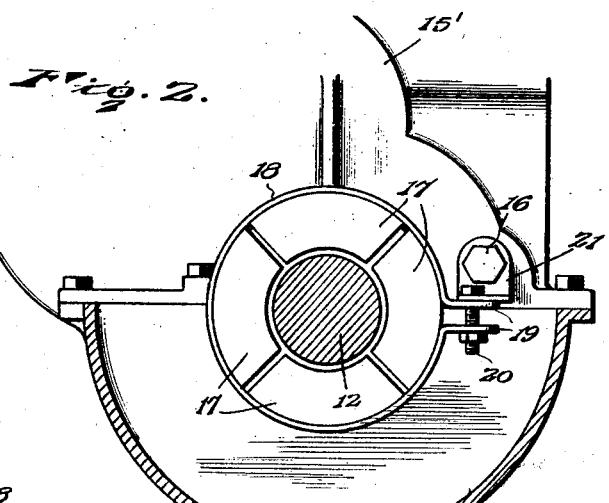
Inventor
A. Pratt.
By
Attorney Patented Aug. 31, 1926.

1,597,868

UNITED STATES PATENT OFFICE.

ANDREW PRATT, OF NASHVILLE, TENNESSEE.

END-THRUST BEARING.

Application filed November 14, 1925. Serial No. 69,053.

This invention relates to an improved adjustable end thrust bearing for engine crank shafts, being especially, although not exclusively, designed for use in connection with the engines of Ford motor vehicles, and seeks, among other objects, to provide a bearing which may be readily applied and adjusted for taking up end play in the crank shaft of an engine without the necessity of removing the engine from the vehicle chassis.

The invention seeks, as a further object, to provide a bearing adapted to function in conjunction with a fan belt pulley at the front end of the crank shaft of a Ford engine and which may be adjustably contracted to coact between the pulley and the timing gear case of the engine for taking up end play in the crank shaft.

And the invention seeks, as a still further object, to provide a novel pulley to coact with the bearing and wherein the pulley may be applied without the necessity for structural change in the engine.

Other objects of the invention not specifically mentioned in the foregoing will appear in the course of the following description.

In the accompanying drawings:—

Figure 1 is a fragmentary vertical sectional view showing my improved bearing applied to the crank shaft of a Ford engine.

Figure 2 is a vertical sectional view on the line 2—2 of Figure 1, looking in the direction indicated by the arrows.

Figure 3 is a fragmentary perspective view particularly showing the anchoring plate for the retaining collar of the bearing sections.

Referring now more particularly to the drawings, the timing gear case of a conventional Ford engine is indicated at 10. The usual front crank shaft bearing is indicated at 11, and the crank shaft at 12. Removably fitting over the forward end of the shaft is a fan belt pulley 13 which is fixed to the shaft by the usual pin 14 and for the purposes of the present invention, this pulley is provided with a conical end wall 15. The timing gear case of the engine is indicated at 15' and this gear case is secured in place by a plurality of bolts, one of which is indicated at 16.

As is well known, when the low gear pedal of the transmission of a Ford vehicle is pressed forwardly, a corresponding rearward pull is exerted on the engine crank shaft with the result that the rear main bearing of said shaft, which bearing sustains the rearward thrust, soon becomes worn. End play of the crank shaft thus develops and since the magnets of the engine magneto are connected with the crank shaft, these magnets are shifted, when the crank shaft is moved endwise, relative to the fixed coil ring of the magneto. Thus, the magneto is caused to function improperly and difficulty is experienced in starting the engine. The present invention, therefore, seeks to overcome the difficulty by providing an end thrust bearing which may be readily applied and adjusted for taking up the end play in the crank shaft.

The improved bearing is formed of a plurality of mating segmental sections 17. In the present instance, I have shown the use of four of said sections and, as will be observed, the end faces of the sections are flat and extend radially with respect to the axis of the bearing. The bearing sections are interposed between the crank shaft bearing 11 and pulley 13 and are formed to freely encircle the crank shaft 12 while, at their rear sides, said sections are provided with flat faces to rest flat against the forward end face of the bearing 11. However, at their forward sides, said sections are provided with inclined end faces to coact with the end wall 15 of the pulley 13, the forward bearing surface of the end thrust bearing being of conical shape to seat said end wall of the pulley flat thereagainst. Surrounding the bearing sections 17 is a resilient collar 18 which is provided at its ends, as seen in Figure 2, with lateral ears 19, and extending through said ears is an adjusting bolt 20. Secured at one end to the timing gear case 15' by the bolt 16, is an angle bracket 21, the opposite end of which is apertured to accommodate the bolt 20 so that said bracket thus serves to anchor the retaining collar 18 and prevent rotation of the end thrust bearing.

As will now be seen in view of the foregoing, the bearing sections 17 will coact between the crank shaft bearing 11 and the pulley 13 for sustaining rearward thrust on the crank shaft 12. When the end thrust bearing is initially applied, the ends of the sections 17 are, as shown in Figure 2, spaced apart. Accordingly, the nut of the bolt 20 may be adjusted for contracting the collar 18 and shifting the sections 17 radially inward toward the axis of the bearing for contracting the bearing. The bearing sections 17 will thus be advanced between the crank shaft bearing 11 and the end wall 15 of the pulley 13 so that the inclined forward faces of said sections will coact with said end wall for wedging the crank shaft 12 forwardly and taking up the end play in the crank shaft. Thus, the end thrust bearing may be readily adjusted from time to time to take up end play in the crank shaft, as such end play develops while, as will be perceived, said bearing will relieve the rear main crank shaft bearing of all rear end thrust load.

Having thus described the invention, I claim:—

1. The combination with an engine crank shaft, a bearing journaling the shaft near its forward end, and an element fixed to the forward end of the shaft, of a contractible end thrust bearing including a plurality of radially shiftable sections coacting between said first mentioned bearing and said element for limiting the shaft against rearward movement, said sections being tapered towards the shaft in cross section to provide wedges, a contractile collar fitted about said thrust bearing, and means for tightening said collar to shift the sections of the thrust bearing inwardly into tight wedging fit between the first-mentioned bearing and said element and take up end play in the crank shaft, said means being engageable with a support to hold the thrust bearing against rotation.

2. The combination with an engine crank shaft, a bearing journaling the shaft near its forward end, and an element fixed to the forward end of the shaft, of a contractile end thrust bearing including a plurality of radially shiftable sections coacting between said first mentioned bearing and said element for limiting the shaft against rearward movement, said sections being tapered towards the shaft in cross section to provide wedges, a contractile retaining collar encircling said sections, and means for contracting the collar and shifting said sections radially towards the shafts to contract the end thrust bearing into wedging engagement with the first-mentioned bearing and element for taking up end play in the crank shaft.

3. The combination with an engine crank shaft, a bearing journaling the shaft near its forward end, and an element fixed to the forward end of the shaft, of a contractible end thrust bearing including a plurality of radially movable sections having wedging fit between said first mentioned bearing and said element for limiting the shaft against rearward movement, a split retaining collar encircling said sections, a fixed bracket, and means connecting said collar with said bracket and adjustable for contracting the collar to shift said sections radially towards said shaft for contracting the end thrust bearing and forcing the shaft forwardly to take up end play therein.

4. An end thrust bearing for engine crank shafts including a plurality of mating segmental sections decreasing in thickness towards their inner peripheral edges to form wedges and shiftable radially with respect to the axis of the bearing, a split retaining collar encircling said sections, an anchoring bracket, and means extending through the ends of the collar and connecting the collar with said bracket, said means being adjustable for drawing the ends of the collar towards each other and shifting said sections radially inward to contract the bearing.

In testimony whereof I affix my signature.

ANDREW PRATT. [L. S.]